(No model.)

H. L. ALDIS.
PHOTOGRAPHIC LENS.

No. 560,460.  Patented May 19, 1896.

Witnesses
B. W. Miller
E. A. Palloch

Inventor
Hugh L. Aldis
By his Attorneys
Baldwin, Davidson & Wight

UNITED STATES PATENT OFFICE.

HUGH LANCELOT ALDIS, OF LONDON, ENGLAND.

PHOTOGRAPHIC LENS.

SPECIFICATION forming part of Letters Patent No. 560,460, dated May 19, 1896.

Application filed September 20, 1895. Serial No. 563,084. (No model.)

*To all whom it may concern:*

Be it known that I, HUGH LANCELOT ALDIS, secretary of J. H. Dallmeyer, Limited, a subject of the Queen of Great Britain, residing at 25 Newman Street, London, in the county of Middlesex, England, have invented certain new and useful Improvements in Photographic Lenses, of which the following is a specification.

The lens forming the subject of this invention is made up of two compound lenses, the front one being a deep, strongly-converging meniscus lens with strong positive spherical aberration, but being approximately correct for chromatic aberration, while the rear one is a diverging system with strong negative spherical aberration to correct the positive aberration of the front lens and also approximately correct for chromatic aberration, the whole forming a converging system correct for spherical and chromatic aberrations and free from distortion.

The front lens is preferably made of two lenses cemented together as follows: the first a converging lens of high refractive index, while the other is a diverging lens of about the same refractive index as the converging lens. In some cases it is necessary to cement behind these a converging meniscus, also of about the same refractive index as the other two. The rear lens consists of two lenses separated by a small air-space. The front lens is a thick nearly plano-convex lens of high refractive index, and the rear lens a diverging concavo-convex lens of low refractive index. Preferably, however, either or both of these lenses may be themselves double cemented combinations of a diverging lens of low refractive index and a converging lens of high refractive index. For some purposes the whole lens may be turned around end for end.

Figure 1:
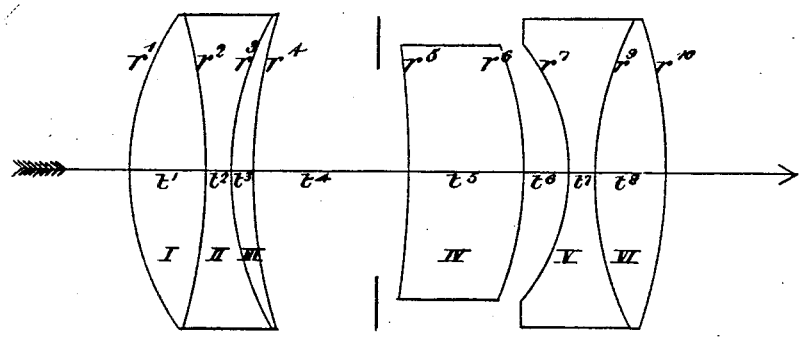
Figure 2:
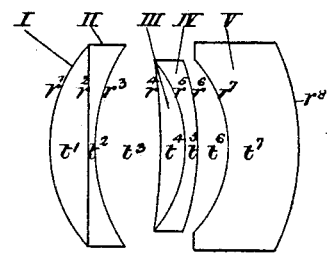

Figure 1 is a longitudinal section of a lens made according to this invention, and Fig. 2 is a similar view of a modification.

In the lens shown in Fig. 1 the radii of curvature of the surfaces $r^1$ to $r^9$ are as follows:

| Inches. | Inches. | Inches. |
|---|---|---|
| $r^1= -2.15$ | $r^4= -4.21$ | $r^7= +1.55$ |
| $r^2= +4.53$ | $r^5= +7.15$ | $r^8= -2.64$ |
| $r^3= -2.49$ | $r^6= +2.64$ | $r^9= +3.77$ |

The distances $t^1$ to $t^8$ between the surfaces are as follows:

| Inches. | Inches. | Inches. |
|---|---|---|
| $t^1= .60$ | $t^4= 1.20$ | $t^7= .20$ |
| $t^2= .20$ | $t^5= .89$ | $t^8= .55$ |
| $t^3= .16$ | $t^6= .35$ | |

The refractive indices of the glasses for the D and H lines of the spectrum, respectively, are as follows:

|  | $u$ for D line. | $u$ for H or G line. |
|---|---|---|
| I | 1.5399 | 1.5514 |
| II | 1.5738 | 1.5920 |
| III, IV, and VI | 1.5726 | 1.5853 |
| V | 1.5151 | 1.5267 |

In the lens shown at Fig. 2 the radii of curvature of the surfaces $r^1$ to $r^8$ are as follows:

| Inches. | Inches. | Inches. |
|---|---|---|
| $r^1= -1.15$ | $r^4= +4.375$ | $r^7= +.965$ |
| $r^2=$ nearly plano | $r^5= +1.0000$ | $r^8= +1.81$ |
| $r^3= -1.39$ | $r^6= +1.95$ | |

The distances $t^1$ to $t^7$ between the surfaces are as follows:

| Inches. | Inches. | Inches. |
|---|---|---|
| $t^1= .30$ | $t^4= .19$ | $t^7= .54$ |
| $t^2= .05$ | $t^5= .10$ | |
| $t^3= .50$ | $t^6= .23$ | |

The refractive indices of the glasses are as follows:

|  | $u$ for D line. | $u$ for H line. |
|---|---|---|
| I and III | 1.5726 | 1.58530 |
| II | 1.5738 | 1.59198 |
| IV and V | 1.5100 | 1.52005 |

Focal length 9 inches.

What I claim is—

1. A converging lens made up of two compound lenses one a deep converging meniscus with strong positive spherical aberration containing a converging and a diverging component both of high refractive index and the other a diverging system with strong negative aberration.

2. A converging lens made up of two compound lenses one a deep converging meniscus with strong positive spherical aberration containing a converging and a diverging component both of high refractive index and the other a diverging system with strong negative aberration in which the diverging components are of low and the converging components of high refractive index.

3. A converging lens made up of two compound lenses one a deep converging meniscus with strong positive spherical aberration containing a converging and a diverging component both of high refractive index and the other a diverging system with strong negative aberration made up of a thick nearly plano-convex lens an air-space and a concavo-convex lens, the diverging components being of low and the converging components of high refractive index.

4. A converging lens made up of two compound lenses one a deep converging meniscus with strong positive spherical aberration containing a converging and a diverging component both of high refractive index and the other a diverging system with strong negative aberration made up of a thick nearly plano-convex lens, an air-space, a double concave lens, and a double convex lens, the diverging components being of low and the converging components of high refractive index.

5. A converging lens made up of two compound lenses one a deep converging meniscus with strong positive spherical aberration containing a converging and a diverging component both of high refractive index and the other a diverging system with strong negative aberration made up of a converging lens, a diverging lens, an air-space and a diverging lens the diverging components being of low and the converging components of high refractive index.

HUGH LANCELOT ALDIS.

Witnesses:
 JOSEPH LAKE,
 W. PERCY CARPINAEL.

Corrections in Letters Patent No. 560,460.

It is hereby certified that in Letters Patent No. 560,460, granted May 19, 1896, upon the application of Hugh Lancelot Aldis, of London, England, for an improvement in "Photographic Lenses," errors appear in the printed specification requiring correction as follows: On page 1, line 60, the Greek letter $\gamma$ should follow the English capital letter H, and in lines 62 and 85—in the captions " u for D" and " u for H"—the Greek letter $\mu$ should be substituted for the English u, and the Greek $\gamma$ should follow the English capital H; and that the said Letters Patent should be read with these corrections therein that the same may conform to the record of the case in the Patent Office.

Signed, countersigned, and sealed this 11th day of August, A. D., 1896.

[SEAL.]

JNO. M. REYNOLDS,
*Assistant Secretary of the Interior.*

Countersigned:
    JOHN S. SEYMOUR,
        *Commissioner of Patents.*